United States Patent
LaFlamme

[11] Patent Number: 5,957,755
[45] Date of Patent: Sep. 28, 1999

[54] REMANUFACTURED CUTTING INSERT AND METHOD OF REMANUFACTURING THE SAME

[76] Inventor: Robert LaFlamme, R.R. 3 Box 90C, Laconia, N.H. 03246

[21] Appl. No.: 08/975,726

[22] Filed: Nov. 21, 1997

Related U.S. Application Data

[63] Continuation of application No. 08/720,459, Sep. 30, 1996.
[51] Int. Cl.⁶ ...................................................... B26D 1/12
[52] U.S. Cl. ................................. 451/48; 407/113; 407/42
[58] Field of Search ..................................... 407/113, 115, 407/42, 62; 431/48; 29/897, 557, 558

[56] References Cited

U.S. PATENT DOCUMENTS

| | | | |
|---|---|---|---|
| 3,483,605 | 12/1969 | Fabish | 451/48 |
| 3,487,592 | 1/1970 | Kotthaus | 451/48 |
| 3,553,909 | 1/1971 | Tersch | 451/48 |
| 3,561,170 | 2/1971 | Dupuis | 451/48 |
| 5,486,073 | 1/1996 | Satran | 407/113 |
| 5,643,523 | 7/1997 | Simpson | 264/400 |

*Primary Examiner*—Daniel W. Howell
*Assistant Examiner*—Mark Williams
*Attorney, Agent, or Firm*—Michael J. Persson, Esq.; William B. Ritchie, Esq.

[57] ABSTRACT

A cutting insert that is remanufactured from an insert blank using one or more of four unique shapes to provide at least one sharpened edge. The blank can be either a new insert or one that has been dulled and is due to be discarded. The four unique shapes are a compound shape, a radius and flank shape, a bias helical shape and a helical rake shape. The bias helical shape and the helical rake shape can be either positive or negative. The radius and flank shape can be either concave or convex. One or more shapes can be ground on a blank using standard grinding machinery. Performance of the remanufactured insert frequently exceeds the performance obtained from newly manufactured inserts. Further, the expense to produce a remanufactured insert using a discarded blank is far less than the expense to produce a new insert.

16 Claims, 7 Drawing Sheets

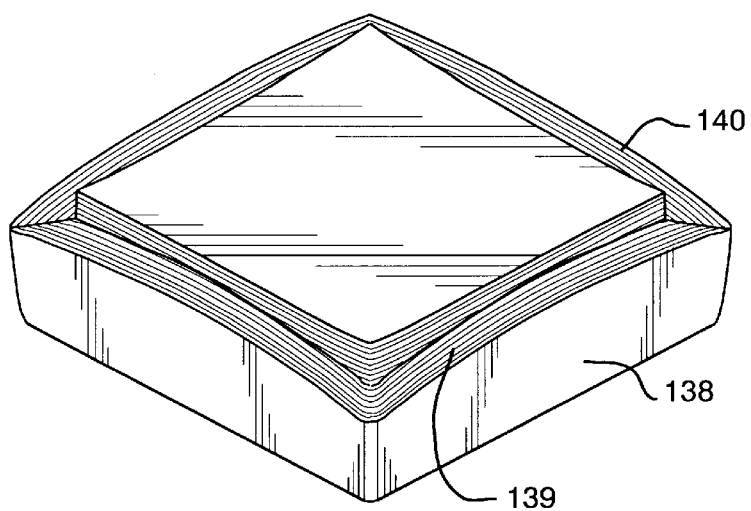
FIG. 14
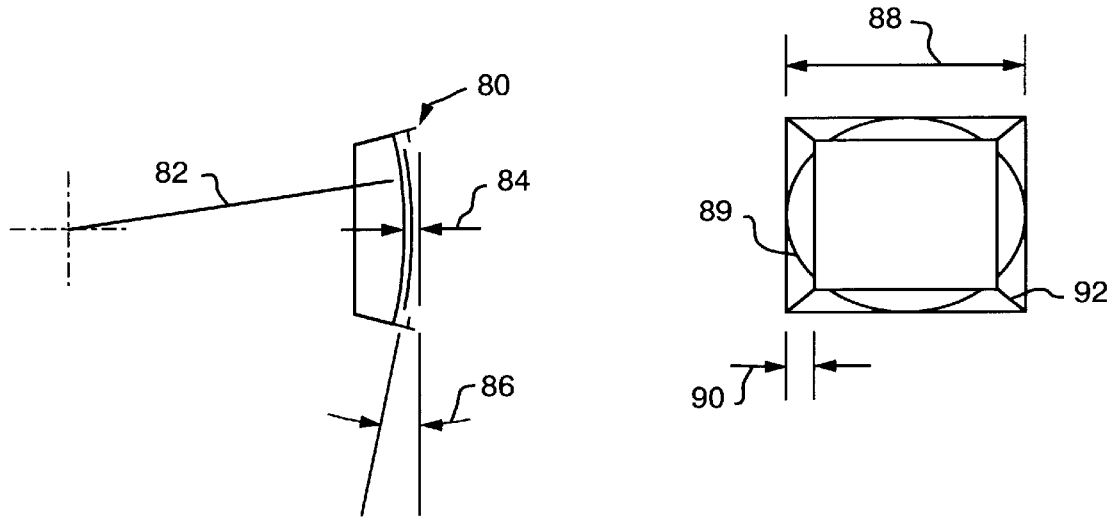
FIG. 15
FIG. 16
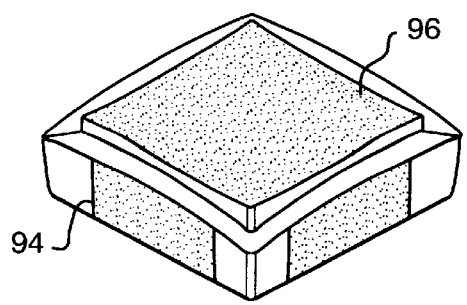
FIG. 17

REMANUFACTURED CUTTING INSERT AND METHOD OF REMANUFACTURING THE SAME

RELATED APPLICATIONS

This application is a continuation of U.S. patent application Ser. No. 08/720,459, filed on Sep. 30, 1996.

BACKGROUND OF THE INVENTION

1. Field of the Invention

The invention relates to cutting inserts that are installed in a tool holder and intended to be thrown away after becoming dull, in particular, remanufacturing "throw away" inserts so that the remanufactured inserts can be used again.

2. Description of the Related Art

The use of cutting tools having replaceable cutting inserts began as long ago as 1917, when Fred P. Lovejoy invented the use of replaceable blades in order to obtain the economic advantages of having to replace only the dull portion of the tool, not the entire tool itself.

The next major improvement was the invention of the tungsten titanium carbide insert by Philip M. McKenna in 1938, especially for use in milling machines. A typical milling machine is an apparatus that features a rotating mill head having a number of indexable cutting inserts, where the rotating head is passed over the workpiece to remove material (chips) from the workpiece. A "chip" refers to the material that is removed during the cutting process. Ideally, the chips produced should be broken into pieces as small as possible since large chips can interfere with the cutting operation and are dangerous to workers.

Since the time of the invention of the carbide cutting insert, tremendous efforts have been made to understand the myriad factors effecting the performance of cutting inserts. These factors include insert geometry, insert construction, cutting temperature, cutting forces, workpiece material characteristics, and, particularly, chip control.

Kennametal, Inc., founded by inventor Philip McKenna, lists thousands of insert geometries/size/composition/coating combinations and permutations in order to meet the requirements of differing applications.

Inserts can be manufactured in various ways. The most common basic materials are tungsten carbide or tungsten titanium carbide combined with a metallic binder such as cobalt. It is also possible to construct inserts from ceramic material. These are referred to as Cermet. Various thin film coatings can be applied to the surface of the cutting insert. Examples of common thin film coatings are titanium nitride, aluminum oxide, chromium nitride, titanium carbo-nitride, titanium aluminum nitride and diamond. Coatings are used to improve the performance and durability of the insert. Each material/coating combination has a particular application to which it is most suited.

In addition to material choices, various basic geometric shapes can also be selected. The most common are the square, triangle, diamond rhomboid, rectangle, hexagon and round. Added to this complexity is a choice of fifteen different clamping options, five different cutting edge forms, dimension tolerance classification, insert thicknesses, etc.

Some inserts have only one sharpened edge suitable for cutting, however, most indexable inserts have a plurality of cutting edges. Once a particular cutting edge has become dull, the insert is indexed in its holder to expose a new cutting edge. Once all cutting edges are dull, the insert is believed to be useless and is thrown away.

All of the above are incorporated into a standardized insert identification system which enables a customer to accurately order any one of more than a million possible combinations and permutations to meet a particular need. Despite the overwhelming number of insert variations that are available, standard inserts still are "standardized". A new insert's shape, type, size and coating are designed to serve many applications.

In spite of the development of sophisticated technology and vast improvements in the durability and cutting efficiency of cutting inserts and the cost increases commensurate with such advances, cutting inserts are still defined and treated as "throw-away", even in the USA Standard Indexable Inserts for Cutting Tools (B94.25-1969).

An example of efforts to improve the cutting efficiency of inserts is found in U.S. Pat. No. 5,372,463, issued to Takahashi et al. on Dec. 13, 1994. In this patent entitled *Throw Away* (emphasis added) *Insert*, it is disclosed that the use of an arcuate small protrusion on the bisector of the nose of the cutting surface will improve chip breaking capabilities of the insert.

U.S. Pat. No. 5,405,711, issued to Noggle on Apr. 11, 1995, is representative of the effort being made to find better materials to construct the insert. Noggle discloses the use of polycrystalline composites to encase the cutting edges of carbide inserts. The polycrystalline material may be diamond, boron nitride or other similar materials. This particular design is said to make the entire insert indexable since the polycrystalline material is presented as a cutting edge around the periphery of the insert.

Still another approach to the improvement of the geometry of the insert is disclosed in U.S. Pat. No. 5,388,932, issued to DeRoche et al. on Feb. 14, 1995. This design is said to provide an efficient positive rake angle when the insert is secured in the milling cutter body.

Pantzar et al. disclose in U.S. Pat. No. 5,421,679, issued on Jun. 6, 1995, the use of a grinding operation intended to be used only along an area against a locating surface of a machine tool. Pantzar et al. disclose that inserts requiring a very high degree of dimensional accuracy have been met by after-grinding the surface(s) adjacent to the cutting edge after the insert is sintered. However, it is said that this grinding (called contour grinding) causes adverse modifications in the micro-geometry of the insert. This invention discloses modification of tool attachment surfaces for improving fit within the tool and avoiding the cutting surfaces.

As disclosed by Pantzar et al., it has been a commonly held truism in the art for more than 45 years that inserts cannot be sharpened once dull without damaging the geometry of the insert. Consequently, this is the reason for the mistaken belief that the inserts must be thrown away once dull.

This belief has been reinforced by failed efforts to regrind used inserts to gain additional useful life before the insert must be discarded. The most ambitious of the regrinding attempts to reclaim dulled inserts, frequently referred to as "down-sizing", is provided by North American Carbide, Inc. of Broken Arrow, Okla. In this process, the "scrap"/used insert is reground using specially adapted grinding machinery so that an insert that is virtually identical to the original, only slightly smaller is obtained. Unfortunately, the success of this process has been rather limited. Since the reground insert is smaller than the original, the reground insert does not fit accurately in the original tool holder. Since the reground insert is smaller overall, the inscribed circle is also reduced. Inscribed circle is defined as the largest internal circle that can be drawn such that all sides of the insert are tangent to that circle. This can sometimes be countered by the use of shims, however, the use of shims then complicates the installation process. Many companies initially embraced this concept, recognizing the significant financial advantage of being able to increase the life span of an insert. However, the difficulties sometimes encountered with clamping the inserts to fit accurately in the tool holder once it had been refurbished quickly diminished the enthusiasm for the approach. Consequently, the belief that cutting inserts are only capable of a one time use and then must be thrown away continues to prevail after all these years.

A method of grinding a cutting insert, either using a new insert or a dulled insert, that will provide sharpened edges with cutting performance equal to or exceeding a new insert and that will provide an insert which can be held in a tool holder without the use of shims or special holders is not known in the prior art.

SUMMARY OF THE INVENTION

The invention is a remanufactured cutting insert. One or more shapes selected from a set of unique shapes is ground on either a worn insert or new insert to sharpen and improve the cutting edge(s). A worn insert or a new insert that is to be remanufactured will be referenced as a blank. While the shapes are intended primarily to be ground on a worn insert, these shapes when ground on new inserts improve the cutting efficiency and life expectancy of the insert. Instead of throwing away a dull insert, it can now be recycled for a significant cost and energy savings. The volume of worn inserts in the waste stream can be reduced by 50%. The unique shapes are produced by grinding to selectively remove material from the insert that is to be remanufactured. Most importantly, the insert can be customized for a user's particular requirements by selecting a combination of one or more of the shapes, and by selecting a particular angular configuration. New inserts must have 100% edge integrity since the manufacturer has no way of knowing the specific region of the edge that may or may not be used. The remanufacturing process grinds a unique shape on a dulled insert that may have flaws in areas that do not contact the user's workpiece, yet, still function at 100% effectiveness. New indexable inserts must have every edge with 100% edge integrity. A remanufactured insert can have unrecovered edges, yet is still usable and is far more cost effective than discarding the insert which still can be partially reclaimed. New inserts often are limited to dimensional tolerances obtainable using the sintering process, while remanufactured inserts have a degree of accuracy obtainable by grinding.

One or more shapes are ground on the insert to produce the final sharpened edge. The shapes are: a compound shape using three angles from 0° to 45° ground on the top of the insert; a concave or convex shape ground on the insert radius and part of the adjacent flanks; a positive or negative helix ground at a bias angle on the top of the insert; and a positive or negative helical rake ground on a plane with the top edge of the insert. These special shapes combine to provide a set of cutting angles and edge forms. The result is a sharpened and improved cutting edge optimized for specific cutting applications. These shapes are not symmetrical to the molded new insert. The basic locating size and clamping thickness are not changed. Special shims and holders are not required to hold the newly shaped insert in its tool holder. The shapes are easily produced using simple low-cost standard machines and practices. Grinding the special shapes on a blank removes a small amount of material using less than 10% of the energy needed to make new inserts.

It is, therefore, an aspect of the invention to provide a remanufactured cutting insert from a blank that has one of four unique shapes ground onto the cutting insert to provide a sharpened edge.

It is another aspect of the invention to provide a remanufactured cutting insert that is made from a "throw away" insert that is dull.

Another aspect of the invention is to provide a remanufactured cutting insert that can be customized to a particular need given the user's machinery and material that is to be cut.

It is still another aspect of the invention to provide a remanufactured cutting insert that has more than one of four special shapes ground onto the cutting insert to provide a sharpened edge.

Another aspect of the invention is to provide a remanufactured cutting insert that can be fabricated using substantially less energy than is necessary to make a new insert.

It is still another aspect of the invention to provide a remanufactured cutting insert that has the basic insert size at the inscribed circle that was present at the time the insert was new.

Still another aspect of the invention is to provide a remanufactured cutting insert that has no reduction in thickness in the clamping area as compared to a new insert.

Another aspect of the invention is to provide a remanufactured cutting insert that can be used without the need for special holders or shims in order to install the remanufactured cutting insert into a tool holder.

Another aspect of the invention is to provide a remanufactured cutting insert that can be recoated after the sharpening process.

It is an aspect of the invention to provide a remanufactured cutting insert that can be easily identified from a new insert by visual inspection.

It is still another aspect of the invention to provide a remanufactured cutting insert that can recover at least 80% of worn inserts that were intended to be discarded.

Another aspect of the invention is to provide a remanufactured cutting insert that has cutting performance that ranges from 85% to 150% of the cutting performance obtained from a new insert of like configuration.

Finally, it is an aspect of the invention to provide a remanufactured cutting insert that can be easily produced using low-cost standard grinding machines and practices.

Other aspects and advantages of the present invention will become apparent and obvious from a study of the following description and the accompanying drawings which are merely illustrative of the invention.

BRIEF DESCRIPTION OF THE DRAWINGS

FIG. 14 is an isometric view of a square shaped insert that has been remanufactured using the helical rake shape in accordance with the invention.

FIG. 15 is a side view of the insert of FIG. 14.

FIG. 16 is a top plan view of the insert of FIG. 14.

FIG. 17 is an isometric view of the insert of FIG. 14 showing the clamping area and the locating area that cannot be ground.

DETAILED DESCRIPTION OF THE INVENTION

The inventor has discovered that cutting inserts, irrespective of the basic geometry, clamping type, coating or absence thereof, indexable or single edged, and other myriad possibilities that go into making the cutting insert, can be remanufactured using one or more of four unique shapes to remanufacture the insert so that it can be used again. In fact, the inventor has found that by using one or more of these shapes on new inserts, the performance is substantially better than the originals. Each of the respective four shapes is shown and described with an insert having the basic geometry that is most suited for that shape. However, as will be appreciated by those skilled in the art, more than one of the shapes described herein can be applied to any particular specified insert. To more fully explain the shapes, ground surfaces that are provided to achieve the particular shape will be shown cross-hatched with parallel lines, while critical surfaces that cannot have material removed (to ensure that clamping will not be a problem) are shown shaded.

Figure 1:
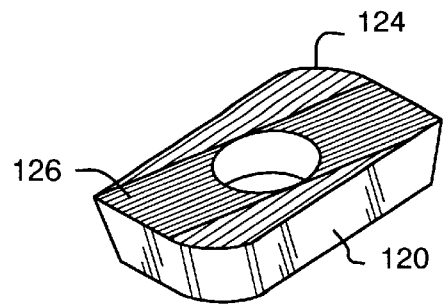
FIG. 1 is an isometric view of a rhomboid-shaped insert that has been remanufactured from a blank using the compound shape in accordance with the invention.
Figure 2:
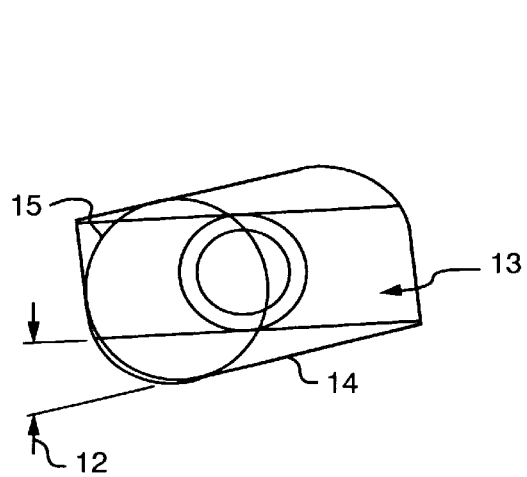
FIG. 2 is a top plan view of the insert of FIG. 1.
Figure 3:
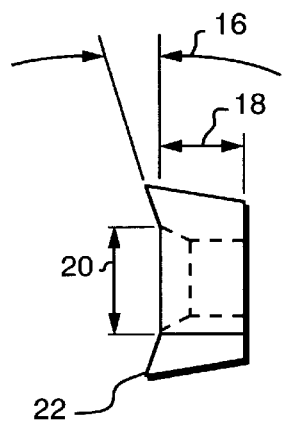
FIG. 3 is a side view of the insert of FIG. 1.
Figure 4:
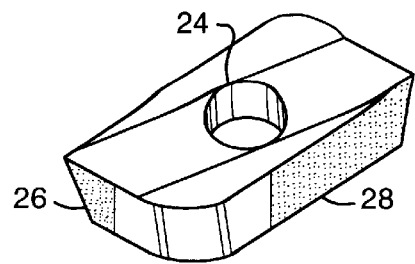
FIG. 4 is an isometric view of the insert of FIG. 1 identifying surfaces that are not ground to prevent clamping problems with the remanufactured cutting insert.

FIG. 1 is an isometric view of a rhomboid-shaped insert 120 that has been remanufactured from a blank using the compound shape 124 in accordance with invention. As is shown in FIGS. 2–4, compound shape 124 is achieved by grinding three angles, rotational angle 12 and wing angles 16, from 0° to 45° on the top rake 126 of the insert 120. The preferred angle for each application depends on a number of factors. While a gross adjustment can be estimated using the criteria discussed below, the precise best choice for any particular cutting index will necessitate an optimization using an empirical approach until the desired results are achieved. Among the most important considerations are the following factors.

The size of the machine that the insert is to be used on will effect the angle selection. Other machine factors include such criteria as feed rates, machine horsepower, depth of cut, heat control, coolant systems, etc. Smaller machines generally require the use of a greater angle (higher rake), that is, more positive. Rake angle refers to the angle between the face of the cutting tool and the work. The work holding system is also an important consideration. The more rigid the clamping system that is utilized, the higher the rake angle that can be used. Tool rigidity also plays a role in the selection of the proper angle. The greater the extension of the tool holder and potential flexing, the less rake that can be used. Cutting edge preparation also plays an important role in the angle selection process. Most edges on inserts are pre-dulled in a process referred to as "honing". An edge that has not been pre-dulled can fracture and prematurely fail.

The workpiece itself must also be considered. As a rule of thumb, soft materials such as aluminum require the use of greater rake angles, typically ranging from 15° to 50°, while harder materials such as steel necessitate the use of smaller rake angles. The physical shape of the part is a major factor which will determine how rigid the part can be held. The more rigid the part is held, the higher the rake angle that can be utilized. Finally, the insert shape itself will determine the limits of the angle selected since the shape of the remanufactured insert must compliment the shape of the original insert.

FIG. 2 is a top plan view of the insert 120 showing rotational angle 12. Rotational angle 12 is defined as the angle formed between a plane formed by the cutting edge 14 and a plane parallel to the center surface 13 of the insert 120. The usual range for rotational angle 12 is from 0° to 25°. Usually, 10° is the typical angle for most applications. The length of the cutting edge 14 is the perimeter of insert 120 and is tangent to inscribed circle 15. As noted above, however, the angle selection can vary substantially depending on the particular selection of machine, workpiece, and insert.

FIG. 3 is a side view of the insert showing rake angle 16 usually from 5° to 30°. When hard metals are being cut, such as tool steel, rake angle 16 is normally selected to be from 5° to 15°. When soft metals are being cut, such as aluminum, rake angle 16 preferably ranges from 15° to 30°. As noted above, what determines which angle is finally selected depends on the factors discussed above and must be empirically derived by evaluating cutting performance factors such as chip length and shape.

Height 18 and center width 20 combine with wing angle 16 to produce the compound shape 124, which sharpens the cutting edge 22. An average of 0.020 inches depth of material is removed in the sharpened area. Remanufactured insert 120 is easily identified from an insert fresh from the manufacturer in that the areas of the insert that have been ground have a high luster resulting from the grinding operation. This difference is easily noted even after the remanufactured insert has been recoated. The unique shapes can be ground on the used (or new) insert using standard grinding equipment that is well known in the art and readily available. While an automated approach permits a lower cost for each remanufactured insert, the use of very simple grinding equipment, as long as using one or more of the unique shapes discussed herein is utilized, will result in the insert being successfully remanufactured.

FIG. 4 is an isometric view of insert 120 in which areas that cannot be altered are identified. Areas 26 and 28 are required to position the insert in a holder (not shown) and cannot be ground. The compound shape 124 is normally used to sharpen inserts which are locked in a holder with a screw through a countersunk lockscrew hole 24. As noted above, however, this shape is not limited to inserts having this particular geometry and method of attachment in its holder.

Figure 5:
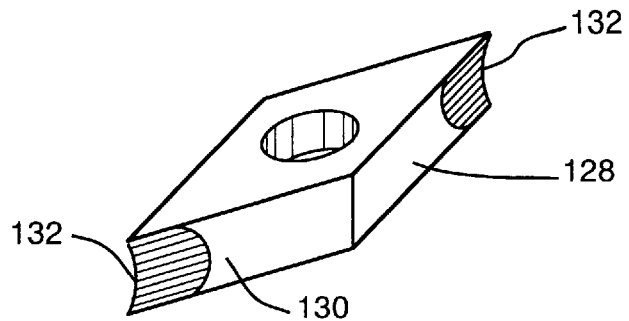
FIG. 5 is an isometric view of a diamond-shaped insert that has been remanufactured using the radius and flank shape in accordance with the invention.

FIG. 5 is a perspective view of the radius and flank shape 132 ground on the side rake 130 of a diamond-shaped insert 128.

Figure 6:
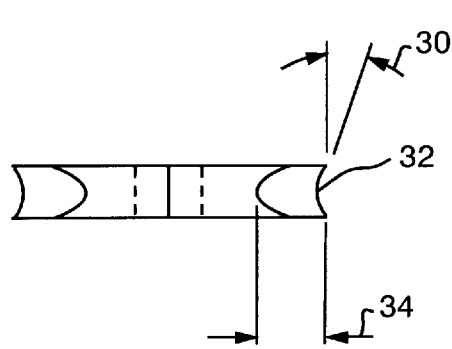
FIG. 6 is a side view of the insert of FIG. 5 showing a concave radius and flank shape.

FIG. 6 is a side view of insert 128 showing the ground concave shape 32. This increases side rake angle 30 up to 5° through length 34. Soft metals being cut, such as aluminum, require up to 5° increase in side rake angle 30. As before, the precise selection of the preferred angle is dependent upon the particular need of the user.

Figure 7:
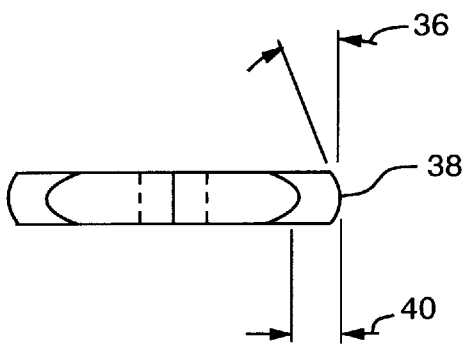
FIG. 7 is a side view of the insert of FIG. 5 showing a convex radius and flank shape.

FIG. 7 is a side view of the insert 128 showing the ground convex shape 38. This decreases side rake angle 36 by up to 5° through length 40. Hard metals being cut, such as tool steel, require up to 5° decrease in side rake angle 36.

Figure 8:
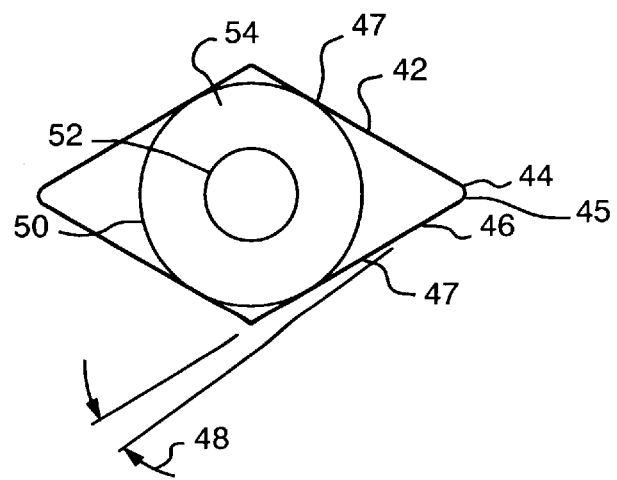
FIG. 8 is a top plan view of the insert of FIG. 5.

FIG. 8 is a top plan view of the insert 128 showing the length of the sharpened edge 44 from 42 to 46. The ground shape has a runout angle 48 of 1° to 3° from the insert flank 47, and a radius 45 adjacent to the flanks 47. An average of 0.020 inches depth of material is removed in the ground area. The inscribed circle 50 is tangent to the flank locating areas which position the insert 128 in the holder. Radius and flank grinding must not reduce the diameter of inscribed circle 50 or the insert 128 will not fit properly in its holder. The radius and flank shape is used to remanufacture inserts which are locked in a holder with a screw through lockscrew holder 52 or with a clamp which locks on the top surface 54.

Figure 9:
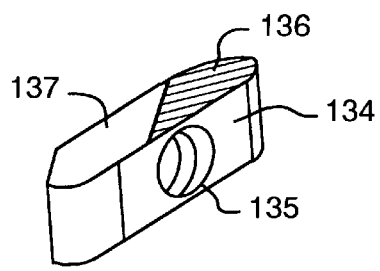
FIG. 9 is an isometric view of a parallelogram-shaped insert that has been remanufactured using the bias helical shape in accordance with the invention.

FIG. 9 is an isometric view of a parallelogram-shaped insert 134 that has been remanufactured using the bias helical shape 136. The bias helical shape 136 is ground at a bias angle 56 on the top rake 137 of the insert 134.

Figure 10:
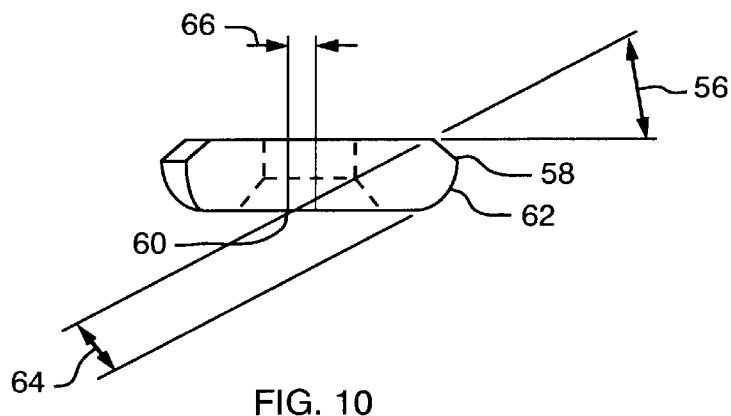
FIG. 10 is a top plan view of the insert of FIG. 9.

FIG. 10 is a top plan view of the insert 134 showing the length of the sharpened cutting edge 62 from 58 to 60 through width 64. The bias angle 56 is 15° to 45° determined by the sharpened cutting edge 62 at point 60. Length 66 may not be greater than 1/16 of an inch to maintain sufficient physical support in the cutter body.

Figure 11:
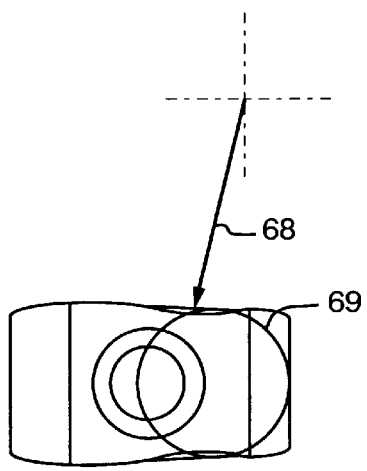
FIG. 11 is a front plan view of the insert of FIG. 10.

FIG. 11 is a front plan view of the insert 134 showing the helical radius 68, which is tangent to inscribed circle 69 and equal to the length of the sharpened edge 62 in FIG. 10 from 58 to 60. Radius 68 typically ranges from 0.1 to 2 inches with the most commonly selected value being about 1 inch.

Figure 12:
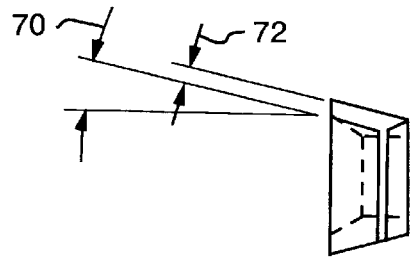
FIG. 12 is a side view of the insert of FIG. 9 showing the change in the top rake in the ground area.

FIG. 12 is a side view of the insert showing the change in top rake 70 in the ground area. Top rake 70 ranges usually from +5° to −5°. Soft metals being cut, such as aluminum, require up to +5°. Hard metals being cut, such as tool steel, require up to −5°. An average of 0.020 inches depth of material 72 is removed in the ground area.

Figure 13:
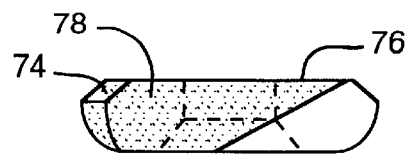
FIG. 13 is a top plan view of the insert of FIG. 9 showing locating surfaces required to position the insert in the holder and that cannot be ground.

FIG. 13 is a top plan view of insert 134 showing side 74, back 76, and top area 78 which are locating surfaces required to position the insert 134 in the holder and cannot be ground. The helical bias angle shape is normally used to remanufacture inserts which are locked in a holder with a screw through a lockscrew hole 135.

FIG. 14 is an isometric view of the helical rake shape 139 ground on a top plane with the top edge 140 of the insert 138. While FIG. 14 depicts an insert remanufactured with a negative helical rake shape 139, a positive helical rake shape 139 can also be used and the same principles apply thereto.

FIG. 15 is a side view showing the change in top rake 86. This is usually from −10° to +10°. Hard metals being cut, such as tool steel, require up to −10°. Soft metals being cut, such as aluminum, require up to +10°. The helical radius 82 is tangent to the minimum depth 84 and can be determined as approximately 500 times minimum depth 84. An average of 0.020 inches depth of material is removed in the grind area at 84. This sharpens the cutting edge 80.

FIG. 16 is a top plan view of the insert. The length of the cutting edge 92 is the perimeter of the view and is tangent to the inscribed circle 89. The width of the sharpened area 90 can be determined as 0.15 times the overall width 88.

FIG. 17 is a perspective view showing the top clamping area 96 and the locating area of the flank 94 which are required to clamp and position the insert in the holder and cannot be ground. The helical rake shape 139 is normally used to remanufacture inserts which are locked in a holder with a screw through a lockscrew hole or with a clamp which locks on top surface 96.

Figure 18:
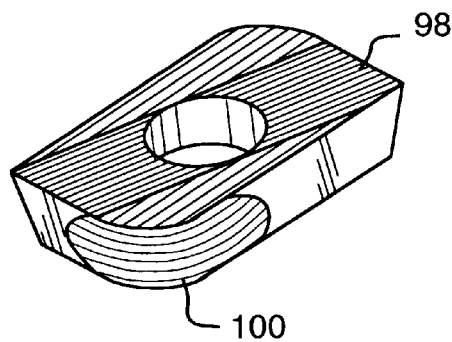
FIG. 18 is an isometric view of an insert using both the compound shape combined with the radius and flank shape.

FIG. 18 is a perspective view of the compound shape on the top rake 98 as described in FIGS. 1, 2, 3, and 4, combined with the concave radius and flank shape on is the side rake 100 as described in FIGS. 5, 6, 7, and 8. This is a typical application of the ground shapes used in combination.

Figure 19:
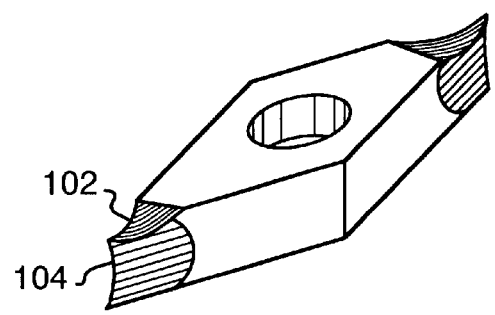
FIG. 19 is an isometric view of an insert using radius and flank shape combined with the bias helical shape.

FIG. 19 is a perspective view of the concave radius and flank shape ground on the side rake 104 as described in FIGS. 5, 6, 7, and 8, combined with the bias helical shape ground at a bias angle on the top rake 102 as described in FIGS. 9, 10, 11, 12, and 13. This is a typical application of the ground shapes used in combination.

Figure 20:
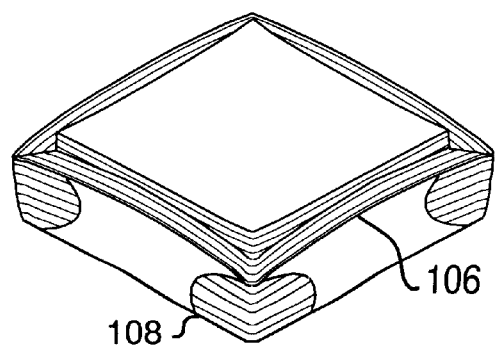
FIG. 20 is an isometric view of an insert using helical rake shape combined with the radius and flank shape.

FIG. 20 is a perspective view of the negative helical rake shape on a plane with the top edge 106 as described in FIGS. 14, 15, 16, and 17, combined with the concave radius and flank shape on the side rake 108 as described in FIGS. 5, 6, 7, and 8. This is a typical application of the ground shapes used in combination.

Figure 21:
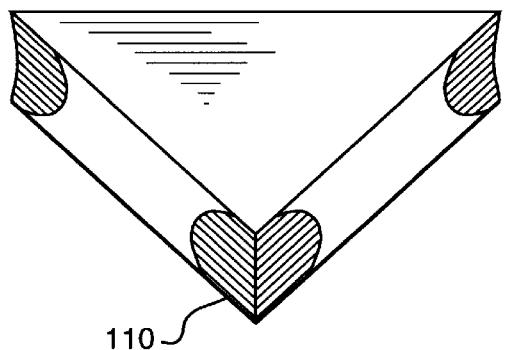
FIG. 21 is an isometric view of a triangular-shaped insert using the radius and flank shape.

FIG. 21 is a perspective view of the concave radius and flank shape 110 as described in FIGS. 5, 6, 7, and 8, ground on a standard triangle insert. This is a typical application of this ground shape used to remanufacture other insert geometries as defined in "USA Standard Index (Throw-Away) Inserts for Cutting Tools (B94.25-1969)" by the United States of America Standards Institute. Ref. The American Society of Mechanical Engineers, United Engineering Center, 345 East 47th Street, New York, N.Y. 10017.

Figure 22:
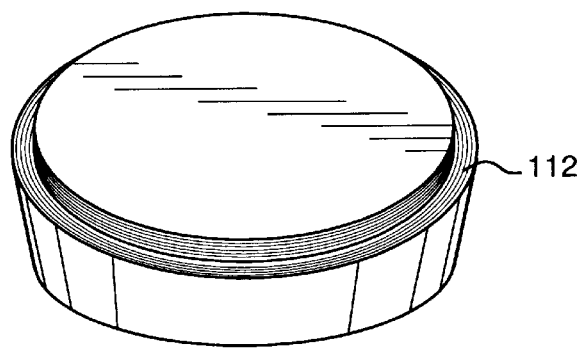
FIG. 22 is an isometric view of a round insert using the helical rake shape.

FIG. 22 is a perspective view of the helical rake shape on a plane with the top edge 112 as described in FIGS. 14, 15, 16, and 17, ground on a standard round insert. This is a typical application of this ground shape used to remanufacture other insert geometries.

Figure 23:
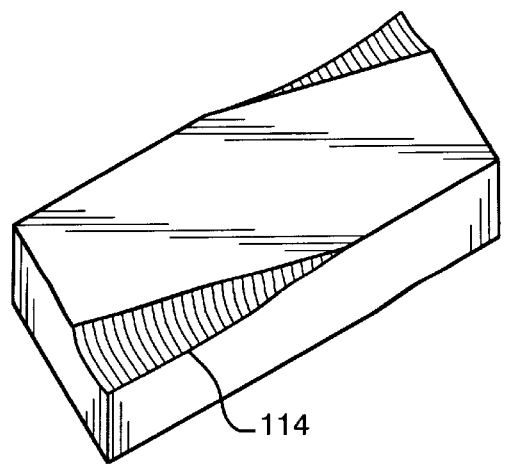
FIG. 23 is an isometric view of a rectangular insert using the bias helical shape.

FIG. 23 is a perspective view of the bias helical shape ground at a bias angle on the top rake 114 as described in FIGS. 9, 10, 11, 12, and 13, ground on a standard rectangular insert. This is a typical application of this ground shape used to remanufacture other insert geometries.

Figure 24:
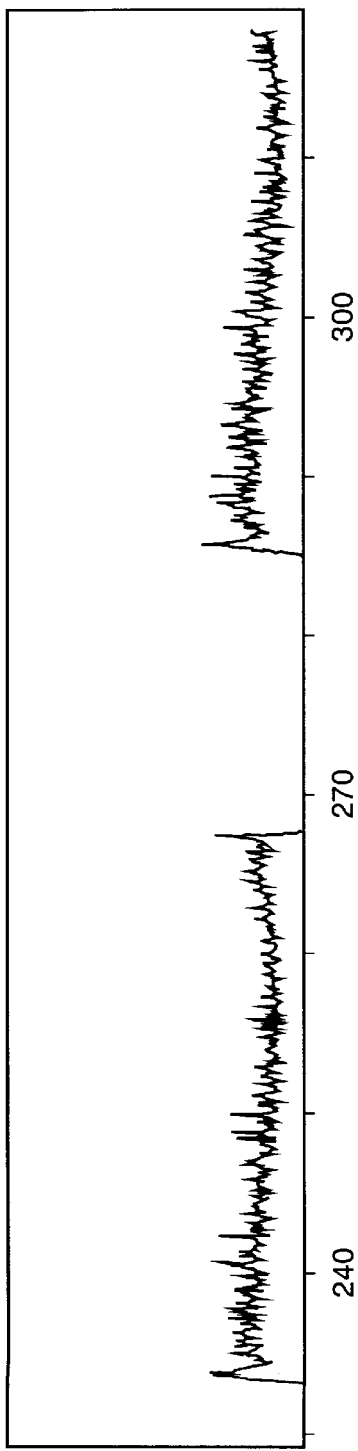
FIG. 24 is a graph of tool action for an insert as supplied by the manufacturer.
Figure 25:
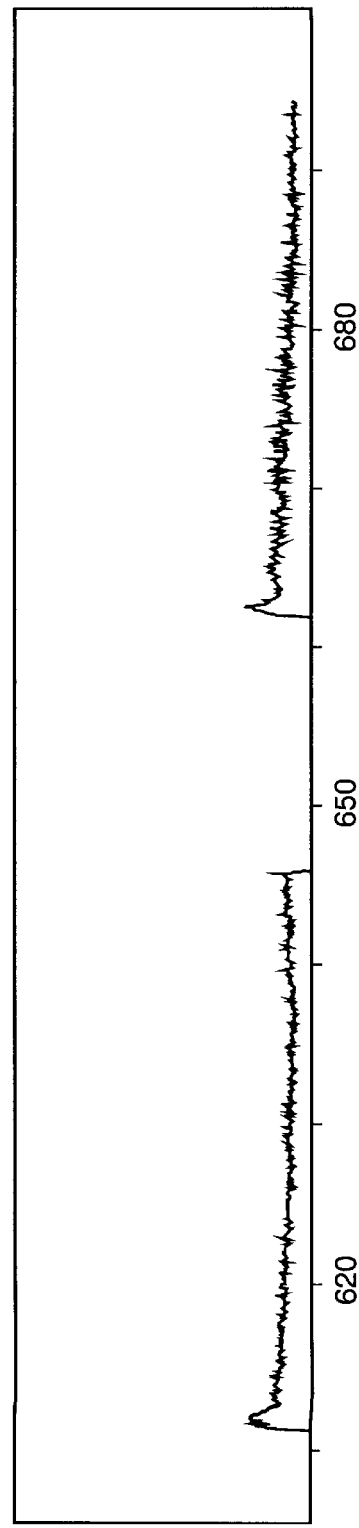
FIG. 25 is a graph of tool action for the same insert of FIG. 24 after it has been remanufactured in accordance with the invention.

A representative example of performance improvement that is obtained is shown in FIGS. 24 and 25. A tool action analyzer, such as the ATAM-1100 manufactured by ATAM Systems Inc. of Worthington, Ohio, enables the visible, real-time measurement of the energy transfer between the tool and the workpiece. Vibration is common to all machine tools. Acceleration, which is one of the five components of vibration, provides the optimum indication of the interaction between the tool and the chip. The analyzer utilizes an accelerometer sensor which is used to determine the energy transfer. The greater the fluctuation in the tracing versus time, the greater the vibration or shock that the tool is experiencing and the quicker the tool will reach its breakage or wear limits.

In this example, the insert was a Helamill 2 manufactured by Iscar. A TiCN coating was used on the insert. The insert was being used to cut steam turbine blades. The machine was a vertical machining center operating at a speed of 800 surface feet per minute with a feed rate of 12 inches per minute. The depth of cut was 0.25 inches per pass. FIG. 24 shows a graph for a new insert while FIG. 25 shows the results from using a remanufactured insert using the shape described in FIGS. 1–4.

In this example, a 100% improvement in insert edge productivity was found. Further, the cycle time was reduced by 25% per part. Non-cutting time was reduced by 50% per part and the surface finish was 100% improved. Similar improvements have been found with all of the remanufactured shapes disclosed herein.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A method of remanufacturing a cutting insert comprising the steps of:
   acquiring a used cutting insert having, an inscribed circle, a clamping area, a top edge, and at least one cutting edge; and
   removing selected material from said used cutting insert to yield a predetermined shape such that a diameter of said inscribed circle remains substantially constant and such that said cutting edge is sharpened to allow said used cutting insert to be reused;
   wherein said step of removing, selected material comprises the step of grinding selected material from said used cutting insert to yield a shape selected from the group consisting of a compound shape, a radius and flank shape, a bias helical shape, and a helical rake shape.

2. The method of remanufacturing a cutting insert as claimed in claim 1, wherein said step of removing selected material from said used cutting insert comprises the step of grinding a rotational angle and two substantially equal wing angles on the top of said used cutting insert to form a compound shape.

3. The method of remanufacturing a cutting insert as claimed in claim 1, wherein said step of acquiring a used cutting insert comprises acquiring a used cutting insert having a cutting edge that comprises a radius and a pair of flanks adjacent said radius, and wherein said step of removing selected material from said used cutting insert comprises the step of grinding a concave radius and flank shape on said radius and pair of flanks.

4. The method of remanufacturing a cutting insert as claimed in claim 1, wherein said step of acquiring a used cutting insert comprises acquiring a used cutting insert having a cutting edge that comprises a radius and a pair of flanks adjacent said radius, and wherein said step of removing selected material from said used cutting insert comprises the step of grinding a convex radius and flank shape on said radius and pair of flanks.

5. The method of remanufacturing a cutting insert as claimed in claim 1 wherein said step of removing selected material from said used cutting insert comprises the step of grinding a positive helical shape at a bias angle on the top edge of said used cutting insert.

6. The method of remanufacturing a cutting insert as claimed in claim 1 wherein said step of removing selected material from said used cutting insert comprises the step of grinding a negative helical shape at a bias angle on the top edge of said used cutting insert.

7. The method of remanufacturing a cutting insert as claimed in claim 1 wherein said step of removing selected material from said used cutting insert comprises the step of grinding a positive helical rake shape on a plane with the top edge of said used cutting insert.

8. The method of remanufacturing a cutting insert as claimed in claim 1 wherein said step of removing selected material from said used cutting insert comprises the step of grinding a negative helical rake shape on a plane with the top edge of said used cutting insert.

9. The method of remanufacturing a cutting insert as claimed in claim 1 wherein said step of removing selected material from said used cutting insert comprises the step of grinding a predetermined shape into said used cutting insert that is asymmetrical with respect to an original shape of said used cutting insert.

10. A remanufactured cutting insert manufactured by a process comprising the steps of:
    acquiring a used cutting insert having, an inscribed circle, a clamping area, a top edge, and at least one cutting edge; and
    removing selected material from said used cutting insert to yield a predetermined shape such that a diameter of said inscribed circle remains substantially constant and such that said cutting edge is sharpened to allow said used cutting insert to be reused;
    wherein said step of removing selected material comprises the step of grinding selected material from said used cutting insert to yield a shape selected from the group consisting of a compound shape, a radius and flank shape, a bias helical shape, and a helical rake shape.

11. The remanufactured cutting insert as claimed in claim 10, wherein said step of removing selected material from said used cutting insert comprises the step of grinding a rotational angle and two substantially equal wing angles on the top of said used cutting insert to form a compound shape.

12. The remanufactured cutting insert as claimed in claim 12, wherein said step of acquiring a used cutting insert comprises acquiring a used cutting insert having a cutting edge that comprises a radius and a pair of flanks adjacent said radius, and wherein said step of removing selected material from said used cutting insert comprises the step of grinding a radius and flank shape on said radius and said adjacent flanks of said used cutting insert, said radius and flank shape chosen from a group consisting of concave radius and flank shapes and convex radius and flank shapes.

13. The remanufactured cutting insert as claimed in claim 10, wherein said step of removing selected material from said used cutting insert comprises the step of grinding a helical shape at a bias angle on the top edge of said used cutting insert, said helical shape having a bias selected from the group consisting of positive bias and negative bias.

14. The remanufactured cutting insert as claimed in claim 10, wherein said step of removing selected material from said used cutting insert comprises the step of grinding a helical rake shape on a plane with the top edge of said used cutting insert, said helical rake shape chosen from a group consisting of positive helical rake shapes and negative helical rake shapes.

15. The remanufactured cutting insert as claimed in claim 10, wherein said step of removing selected material from said used cutting insert comprises the step of grinding a predetermined shape into said used cutting insert that is asymmetrical with respect to an original shape of said used cutting insert.

16. A method of remanufacturing a cutting insert comprising the steps of:
  acquiring a used cutting insert having, an inscribed circle, a clamping area, a top edge, and at least one cutting edge; and
  removing selected material from said used cutting insert to yield a predetermined shape such that a diameter of said inscribed circle remains substantially constant and such that said cutting edge is sharpened to allow said used cutting insert to be reused;
  wherein said step of removing selected material from said used cutting insert comprises the step of grinding a predetermined shape into said used cutting insert that is asymmetrical with respect to an original shape of said used cutting insert.

* * * * *